United States Patent [19]

Alegranti

[11] 4,113,628

[45] Sep. 12, 1978

[54] ASYMMETRIC POLYIMIDE MEMBRANES

[75] Inventor: Constance Wright Alegranti, Sao Paulo, Brazil

[73] Assignee: E. I. Du Pont de Nemours and Company, Wilmington, Del.

[21] Appl. No.: 677,443

[22] Filed: Apr. 15, 1976

Related U.S. Application Data

[63] Continuation of Ser. No. 476,536, Jun. 5, 1974, abandoned, which is a continuation of Ser. No. 273,805, Jul. 20, 1972, abandoned.

[51] Int. Cl.² .............................................. B01D 31/00
[52] U.S. Cl. ...................... 210/500 M; 260/30.8 DS; 260/32.4; 260/32.6 N; 260/32.6 NR; 260/33.6 R; 260/33.8 R; 264/41; 521/61
[58] Field of Search ...................... 260/2.5 N; 264/41; 210/500 M

[56] References Cited

U.S. PATENT DOCUMENTS

| 3,179,630 | 4/1965 | Endrey | 260/2.5 N |
| 3,179,631 | 4/1965 | Endrey | 260/2.5 N |
| 3,352,388 | 12/1974 | Kimura | 264/41 |
| 3,483,144 | 12/1969 | Lavin et al. | 260/2.5 N |
| 3,852,388 | 12/1974 | Kimura | 264/41 |

FOREIGN PATENT DOCUMENTS 1,212,758  11/1970  United Kingdom ...................... 264/41

*Primary Examiner*—Morton Foelak

[57] ABSTRACT

Asymmetric polyimide membranes are prepared from tetracarboxylic acid dianhydrides and diamines. They are semipermeable and useful in the separation of different chemical species by osmosis, dialysis, electrodialysis and reverse osmosis.

6 Claims, 3 Drawing Figures

ASYMMETRIC POLYIMIDE MEMBRANES

CROSS-REFERENCE TO RELATED APPLICATIONS

This is a continuation of application Ser. No. 476,536, filed June 5, 1974, which in turn is a continuation of application Ser. No. 273,805, filed July 20, 1972, both now abandoned.

BACKGROUND OF THE INVENTION

1. Field of the Invention

This invention is concerned with microporous, asymmetric polyimide films and their use as semipermeable membranes.

2. Description of the Prior Art

The publications listed below show the preparation of polyamic acids from diamines and tetracarboxylic acid dianhydrides, and the conversion of these polyamic acids to polyimides by treatment with heat alone or with chemical dehydrating agents.

U.S. Pat. No. 3,179,630 (A. L. Endrey, 1965)
U.S. Pat. No. 3,179,632 (W. R. Hendrix, 1965)
U.S. Pat. No. 3,424,718 (R. J. Angelo, 1969)
H. Lee, D. Stoffey & K. Neville, "New Linear Polymers", McGraw-Hill, Inc. pp. 205–264 (1967)
W. R. Sorenson & T. W. Campbell, "Preparative Methods of Polymer Chemistry", 2nd Ed., Interscience Publishers, pp. 170–1 (1968)
G. B. Vaughan, J. C. Rose & G. P. Brown, "Polymer Preprints", 11, 339–46 (1970)
H. Scott, F. L. Serafin, P. L. Kronick, Polymer Letters 8, 563–71 (1970).

The process involves spreading a viscous solution of a polyamic acid in an organic solvent onto a solid surface and immersing the assembly in an organic solution of a dehydrating agent such as a combination of acetic anhydride and pyridine whereby a polyimide film is obtained. These films are symmetrical, i.e., of uniform density, since their cross-sections appear uniform throughout. Such uniformly dense films are of limited value as semipermeable membranes.

British patent specification No. 1,212,758 and South African patent application No. 68/5860, filed Sept. 3, 1968, disclose the concept of preparing asymmetric membranes from a variety of polymers, including polyimides. The disclosures show dissolving an already preformed polymer in an organic solvent to form a viscous solution, forming a polymeric film from such solution and then leaching out the solvent to produce an asymmetric membrane. Such membranes, being soluble in organic solvents, also have limited utility.

DESCRIPTION OF THE INVENTION

In contrast to the procedures of the prior art, it has now been found that microporous, asymmetric polyimide membrans having a thin, shiny, relatively dense barrier layer or skin on at least one surface of the membrane, the remainder of the membrane being a dull, less dense layer of the same polyimide, can be made by observing a selected relationship among the components of the chemical cyclizing composition and the polyamic acid solution. When such relationship is employed, both cyclization to a polyimide and the formation of an asymmetric membrane are obtained.

Asymmetric polyimide membranes of the invention are obtained by the process which comprises (1) fashioning a solution containing an aromatic polyamic acid having essentially the unit formula

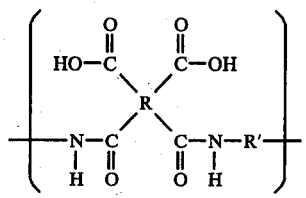

wherein R and R' are as defined hereinafter dissolved in an organic solvent A into the form of a membrane such as film, tube, fiber, or hollow fiber, and (2) immediately, without significant loss of solvent, immersing the fashioned solution in a selected dehydrating or cyclizing solution comprising a lower aliphatic monobasic carboxylic acid anhydride and a tertiary amine, with or without an organic solvent B. There is thus formed a polyimide having essentially the unit formula

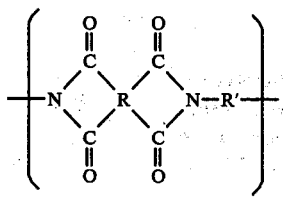

The selected relationship is as follows:

1. When the tertiary amine is a nonsolvent (e.g., a precipitant) for the polyamic acid, the tertiary amine is miscible with solvent A.

2. When the tertiary amine is a solvent for the polyamic acid (e.g., a nonprecipitant), solvent B is present, is a nonsolvent for the polyamic acid and is miscible with solvent A.

Although it is is not intended that this invention be limited to any particular theory, it is postulated that when the precursor polyamic acid solution contacts the selected chemical cyclizing composition, the polyamic acid precipitates and is practically immediately cyclized to the polyimide. It appears that cyclizing compositions or procedures which produce significant cyclization prior to precipitation, as by drying of the polyamic acid solution to remove a significant amount of solvent prior to contact with the cyclizing composition, do not yield asymmetric polyimide structures. The process of the invention produces asymmetric membranes which are soluble or insoluble in organic solvents depending upon the nature of the starting dianhydrides and diamines.

The asymmetric structure is retained on removal of solvent and is usually indicated by optical opacity which appears to be associated primarily with the less dense portion of the structure. The contact time between the polyamic acid solution and the cyclizing composition should be long enough and at a temperature high enough to ensure practically complete cyclization to the polyimide. Following cyclization the polyimide is washed to remove solvents and unreacted materials, if any. The solvent content of the polyamic acid solution generally imparts to the solution a rather quick dope-like consistency. It is possible to use a small excess of solvent in preparing the solution and then to evaporate such excess by judicious use of heat to obtain a solution of good consistency. However, excessive heating or drying prior to contact with the cyclizing solution will not result in the formation of an opaque asymmetric polyimide structure. It should be kept in mind that when the components are properly selected as taught and undue heating or drying is avoided prior to contact with the cyclizing solution, the formation of the desired asymmetric structure will be evidenced by its opacity. Improperly selected components or undue heating will result in the formation of undesired symmetrical structure as evidenced by its transparency. This test can thus serve as a guide in obtaining the structures of the invention.

The membranes of the invention are superior to the prior art membranes in being durable, mechanically integral structures which need not be stored under water and which achieve better separation of chemical species, as for example in the speed in accomplishing the separation. Those which are insoluble in organic solvents are particularly useful in applications involving the separation of chemical species from an organic solvent. These properties contribute to their ability to serve as practically useful membranes.

In the specification and claims the following terms have the meanings set forth. "Insoluble" means the the polyimide does not dissolve more than 10% by weight at 25° C. in a commonly used organic solvent such as N,N-dimethylacetamide, formamide, dimethylsulfoxide, tetramethylurea, and the like. "Solvent" means the liquid in question dissolves more than 10% by weight at 25° C. of the polyamic acid and "nonsolvent" means it dissolves less than 10%.

The product of the inventive process can be described as a microporous, opaque, asymmetric membrane consisting essentially of a polyimide having the repeating formula

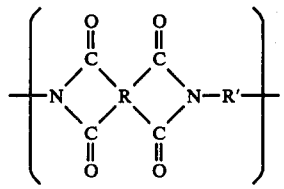

wherein R is a tetravalent radical selected from the group

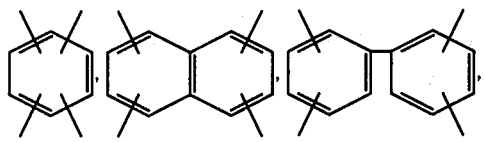

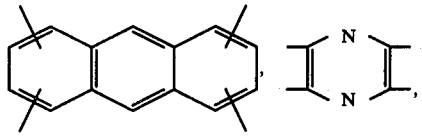

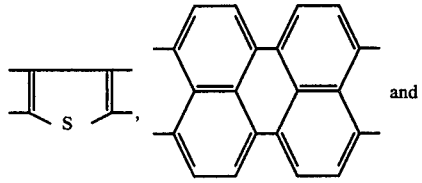

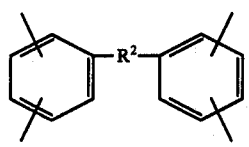

in which $R^2$ is alkylene of 1-3 carbon atoms, haloalkylene of 1-3 carbon atoms, oxygen, sulfur,

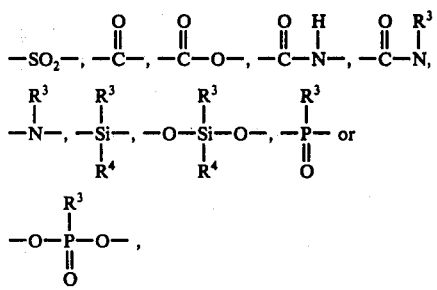

and in which $R^3$ and $R^4$ are lower alkyl or phenyl; and $R'$ is phenylene, tolylene, naphthylene, biphenylene, anthrylene, pyridinediyl and

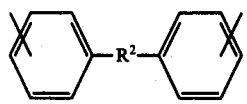

in which $R^2$ is defined as above.

The insoluble membrane aspect of the invention can be described as a microporous, opaque, insoluble, asymmetric membrane consisting essentially of a polyimide having the repeating formula

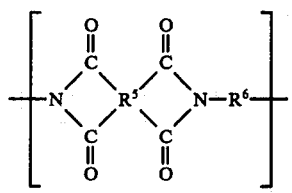

wherein $R^5$ is a tetravalent radical selected from the group

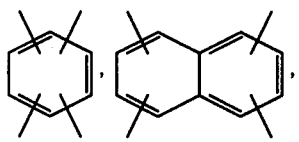

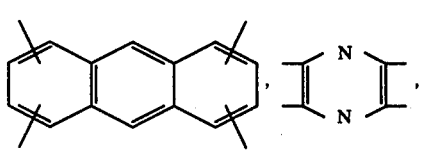

-continued

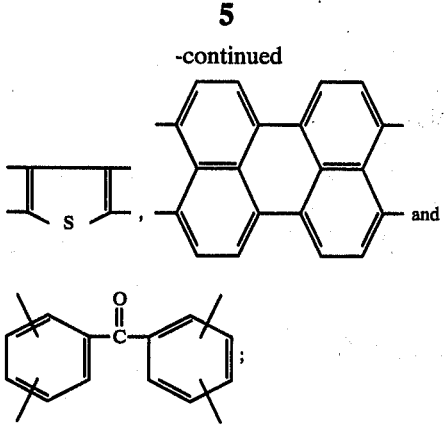
and wherein R⁶ is phenylene, tolylene, naphthylene, biphenylene, anthrylene, pyridinediyl, and

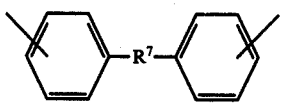

in which R⁷ is oxygen, sulfur and methylene.

In the formulas, R and R⁵ and R' and R⁶ are, respectively, tetravalent and divalent aromatic radicals. In R and R⁵ each pair of bonds preferably stems from adjacent carbon atoms which are in a ring of aromatic character. Preferred compounds are those containing benzenoid rings. These formulas embrace individual polyamic acids and polyimides in which all the R and R⁵ groups are alike and all the R' and R⁶ groups are alike as well as copolyamic acids and copolyimides in which more than one species of R and R⁵ groups and/or more than one species of R' and R⁶ groups can be present in a given polymer molecule. In the copolyamic acids and the copolyimides, the arrangements of units can be alternating, random or block as these terms are commonly understood in the art. Of these, the random copolymers are preferred.

FIG. 1 represents a schematic cross-section view of an asymmetric membrane as seen in an optical microscope. This structure is characteristic of these membranes and the figure shows a thin dense portion and a thicker less dense portion. It is to be understood that the demarkation between the dense and the less dense portions can be gradual and not sharp.

The structure shown in FIG. 1 is also confirmed by electron microscope examination of fractured cross-sections of the membranes of Examples 3 and 22. This was done by wetting the membrane samples with water and then freezing with liquid nitrogen. The samples were then fractured on a cold stage at liquid nitrogen temperature in a vacuum. A layer of platinum on carbon was then sublimed onto each surface to replicate it. The polymers were dissolved away with aqueous sodium hydroxide and the replicate surfaces were examined by electron microscope (Zeiss Model EM9). All the surfaces showed a "ball" type structure, the balls being joined in an integral, continuous structure. The balls were 200-6000A in diameter and were close packed at the skin or top surface. The structures became more random below the skin, showing the presence of voids due to imperfect packing in the less dense layer.

Figure 3:
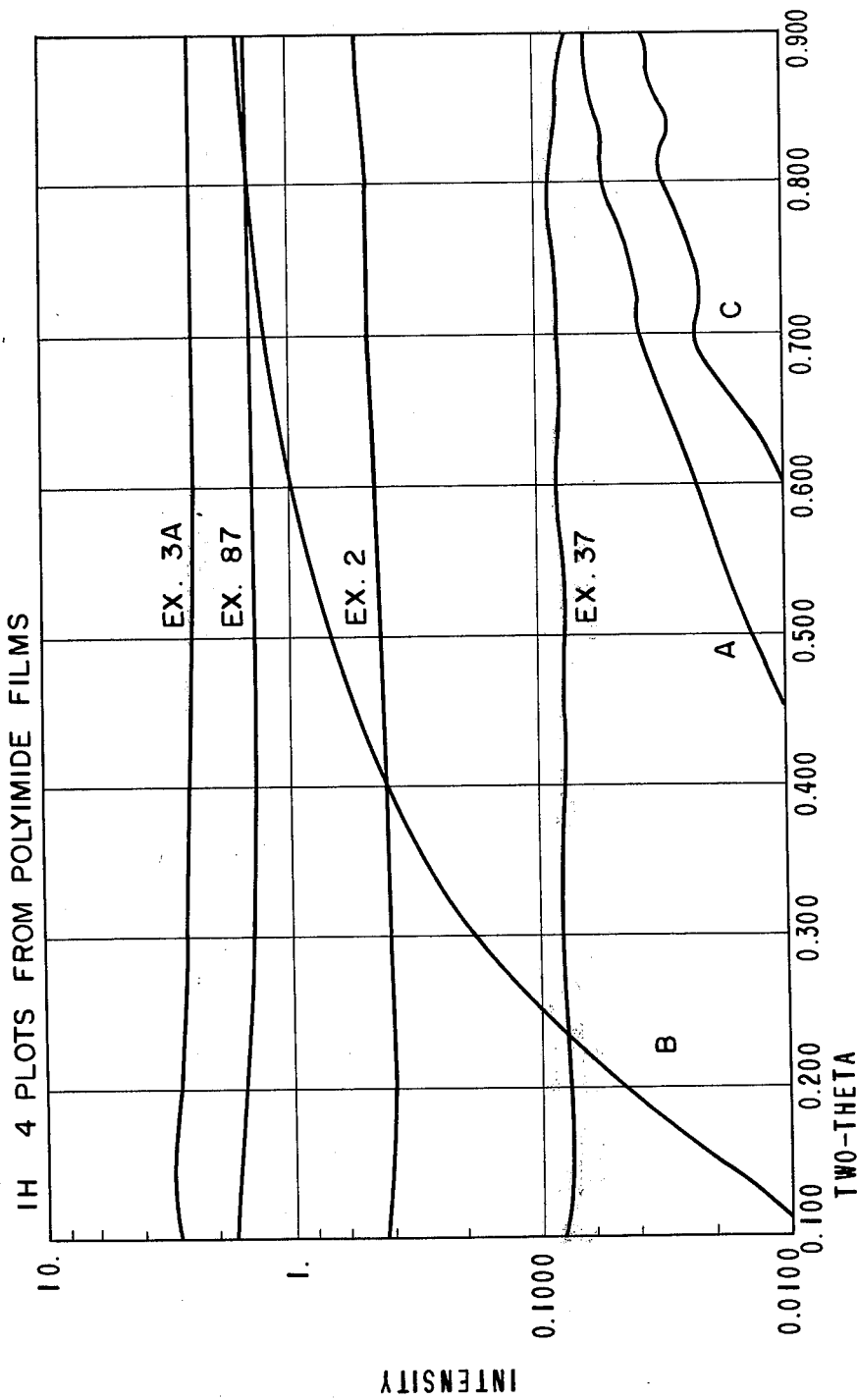
FIG. 3 is a graph showing the characteristic small angle X-ray scattering of the asymmetric membranes, as indicated by lines of essentially zero slope. Symmetrical membranes of the prior art do not scatter small angle X-rays in the same way and are represented by the curved lines.

The corrected pattern of small angle X-ray scattering which is characteristic of these membranes is such that the intensity of the scattering radiation from nickel filtered CuKα radiation multiplied by the fourth power of the scattering angle (2θ) does not vary more than ±10% for at least 0.2° within the angle range (2θ) from 0.2°–0.8°. This is readily shown by the lines of essentially zero slope obtained in a semilog plot of the intensity value (intensity times the fourth power of 2θ) against 2θ in the above range as shown in FIG. 3.

Small angle x-ray scattering measurements were made on a Kratky Diffractometer using a 120 μ diversion slit and a 240 μ receiving slit and a scintillation counter with a pulse height analyzer passing 90% of the radiation. The radiation was nickel filtered CuKα and measurements were made over the range from 0.1°–2.0°.

To obtain an optimum signal to noise level, the thickness of the sample was built up until the ratio of the intensity of the x-ray beam after passing through the sample to the intensity of the unabsorbed beam was in the range from 0.2–0.5. The observed intensities of the scattered radiation were corrected for instrumental background and counter noise and were further desmeared in the region from 0.1°–1.0° by the method of P. W. Schmidt and R. Hight, Acta. Crystallogr. 13, 480–3 (1960).

This measurement of small angle x-ray scattering is based on the theories of G. Porod, Kolloid-Z. Z. Polym., 124, 83–114 (1951); 125, 51–57 (1952); Fortschr. Hochpolym.-Forsch. 2, 363–400 (1961); P. Debye et al., J. Appl. Phys. 28, 670–83 (1957); and A. Guinier et al., "Small Angle Scattering of X-rays", John Wiley & Sons, Inc., 1955, as discussed in a text by L. E. Alexander, "X-ray Diffraction Methods in Polymer Science", Wiley-Interscience, John Wiley & Sons, Inc., 1969.

The precursor polyamic acid is prepared according to known art by reacting at least one tetracarboxylic acid dianhydride with at least one organic diamine in an organic solvent for at least one of the reactions, the solvent being inert to the reactants, preferably under anhydrous conditions for a time and at a temperature below 175° C. sufficient to form "n" moles of polyamic acid each mole containing "m" amide acid linkages. The polyamic acid is then converted to the polyimide by treating it with "n" times "m" moles of a carboxylic acid anhydride in the presence of a tertiary amine. The ratio of the amine to the anhydride can vary from about zero to infinity with 1:1 mixtures being most commonly used.

The degree of polymerization of the polyamic acid is subject to deliberate control. The use of equal molar amounts of the reactants under the prescribed conditions provides polyamic acids of very high molecular weight. The use of either reactant in large excess limits the extent of polymerization. However, the scope of the process encompasses the use of up to 5% excess of either the diamine or the dianhydride. More than 5% excess of either reactant results in an undesirably low molecular weight polyamic acid. For some purposes, it is desirable to use 1-3% excess of either reactant, preferably the dianhydride. Besides using an excess of one reactant to limit the molecular weight of the polyamic acid, a chain terminating agent such as phthalic anhydride may be used to "cap" the ends of the polymer chains.

In the preparation of the polyamic acid intermediate, it is important that the molecular weight be such that the inherent viscosity of the polymer is at least 0.1, preferably 0.3–5.0. The inherent viscosity is measured at 30° C., at a concentration of 0.5% by weight of the polymer in a suitable solvent, e.g., N,N-dimethylacetamide. To calculate inherent viscosity, the viscosity of the polymer solution is measured relative to that of the solvent alone.

$$\text{Inherent viscosity} = \frac{\text{natural logarithm} \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

The tetracarboxylic acid dianhydrides are characterized by the formula

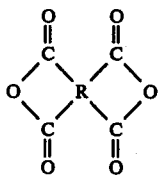

wherein R is a tetravalent radical as previously set forth.

When the dianhydrides shown in Table I below are used in the preparation of the polyimides of this invention, the radical R is as indicated.

TABLE I

| Dianhydrides | R |
|---|---|
| 1. Pyromellitic dianhydride | |
| 2. 3,4,3',4'-Diphenylsulfonetetracarboxylic dianhydride | 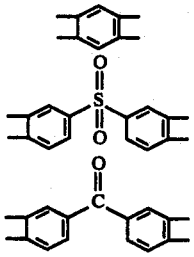 |
| 3. 3,4,3',4'-Benzophenonetetracarboxylic dianhydride | |

TABLE I-continued

| Dianhydrides | R |
|---|---|
| 4. Pyrazinetetracarboxylic dianhydride | |
| 5. 3,4,3',4'-Diphenyldimethylmethanetetracarboxylic dianhydride | |
| 6. 3,4,3',4'-Diphenyldi(trifluoromethyl)methanetetracarboxylic dianhydride | |
| 7. 2,3,6,7-Naphthalenetetracarboxylic dianhydride | |
| 8. 3,4,3',4'-Diphenyltetracarboxylic dianhydride | |
| 9. 3,4,9,10-Perylenetetracarboxylic dianhydride | |
| 10. 3,4,3',4'-Diphenylethertetracarboxylic dianhydride | |
| 11. 1,2,4,5-Naphthalenetetracarboxylic dianhydride | |
| 12. 1,4,5,8-Naphthalenetetracarboxylic dianhydride | |
| 13. 1,8,9,10-Phenanthrenetetracarboxylic dianhydride | |
| 14. 3,4,3',4'-Diphenylmethanetetracarboxylic dianhydride | |
| 15. 2,3,4,5-Thiophenetetracarboxylic dianhydride | |

The organic diamines are characterized by the formula $$H_2N - R' - NH_2$$

wherein R' is as set out above.

When the diamines shown in Table II below are used in the preparation of the polyimides of this invention, the radical R' is as indicated.

TABLE II

| | Diamine | R' |
|---|---|---|
| 1. | 4,4'-Diaminodiphenyl ether | |
| 2. | 4,4'-Diaminodiphenyl sulfone | |
| 3. | 4,4'-Diaminodiphenylbis(trifluoromethyl)methane | |

TABLE II-continued

| | Diamine | R' |
|---|---|---|
| 4. | Lithium 2,4-diaminobenzene sulfonate | 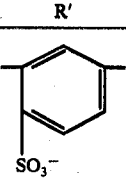 |
| 5. | m-Phenylenediamine | 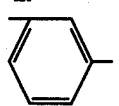 |
| 6. | p-Phenylenediamine | 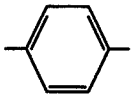 |
| 7. | 4,4'-Diaminodiphenylpropane | 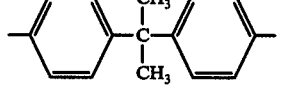 |
| 8. | 2,4-Diaminotoluene | 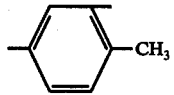 |
| 9. | 4,4'-Diaminodiphenylmethane | 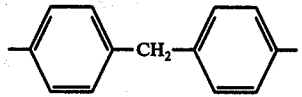 |
| 10. | 4,4'-Diaminodiphenyl sulfide | 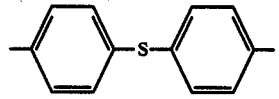 |
| 11. | 2,6-Diaminopyridine | 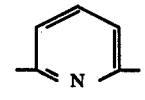 |
| 12. | Bis(4-aminophenyl)diethylsilane | 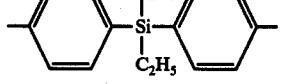 |
| 13. | Bis(4-aminophenyl)diphenylsilane | 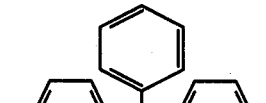 |
| 14. | Benzidine | 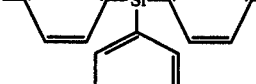 |
| 15. | 3,3'-Dimethoxybenzidine | 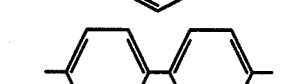 |
| 16. | Bis(4-aminophenyl)ethylphosphine oxide |  |
| 17. | Bis(4-aminophenyl)butylamine | 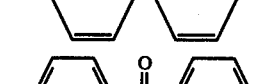 |

TABLE II-continued

| | Diamine | R' |
|---|---|---|
| 18. | Bis(4-aminophenyl)methylamine | (structure) |
| 19. | 1,5-Diaminoaphthalene | (structure) |
| 20. | 3,3'-Dimethyl-4,4'-diamino-biphenyl | (structure) |
| 21. | N-(3-aminophenyl)-4-amino-benzamide | (structure) |
| 22. | 4-Aminophenyl 3-amino-benzoate | (structure) |
| 23. | N,N-Bis(4-aminophenyl)-aniline | (structure) |

Organic solvent A suitable for carrying out the reaction of one or more tetracarboxylic dianhydrides as shown in Table I with one or more diamines as shown in Table II must be substantially inert to the reactants and must be a solvent, i.e., capable of dissolving 10% or more by weight of at least one of the reactants and the resulting polyamic acid. Preferably the solvent dissolves all of the reactants. Stated in somewhat different language, the solvent is an organic liquid other than the reactants or homologs of the reactants and can contain functional groups other than the functional groups of the reactants. The normally liquid organic solvents of the N,N-dialkylcarboxylamide class are useful. Preferred are the N,N-di(lower alkyl) amides of lower alkyl carboxylic acids and particularly N,N-dimethylformamide and N,N-dimethylacetamide. One or more of the solvents can be used. Representative solvents include:

N,N-dimethylformamide, N-methylcaprolactam, N,N-dimethylacetamide, dimethylsulfoxide, N,N-diethylformamide, N-methyl-2-pyrrolidone, N,N-diethylacetamide, tetramethylurea, formamide, dimethylsulfone, N-methylformamide, butyrolactone.

The carboxylic acid anhydride which is considered to be the active dehydrating agent in the cyclizing bath is a lower aliphatic monobasic acid anhydride. This includes acetic anhydride, propionic anhydride, butyric anhydride, valeric anhydride, hexanoic anhydride and the like, either singly or mixtures of them. They can also be employed in admixture with anhydrides of aromatic monocarboxylic acids such as benzoic acid anhydride, naphthoic acid anhydride, etc. The carboxylic acid anhydride is used in at least a stoichiometric equivalent based on the polyamic acid.

The tertiary amine, which is an aliphatic or aromatic amine or mixtures thereof, can be either a solvent or nonsolvent for the polyamic acid. Tertiary amines which are solvents for the polyamic acids include pyridine and 3,5-lutidine, among others. Tertiary amines which are nonsolvents include:

trimethylamine, N,N-dimethylcyclohexylamine, triethylamine, 4-benzylpyridine, N,N-dimethyldodecylamine, 2,4,6-collidine, N,N-dimethylbenzylamine.

Organic solvent B should be miscible with solvent A and a nonsolvent for the polyamic acid. Suitable solvents B include aromatic hydrocarbons, chlorinated aliphatic hydrocarbons, aliphatic nitriles and mixtures thereof.

Representative are:

benzene, trichloroethylene, toluene, tetrachloroethane, tetrachloroethylene, adiponitrile.

Other solvents which are nonmiscible with solvent A may also be present if desired. These include one or more cyclic or acyclic aliphatic hydrocarbons having up to 7 carbon atoms such as cyclohexane, n-heptane, etc.

Figure 2:
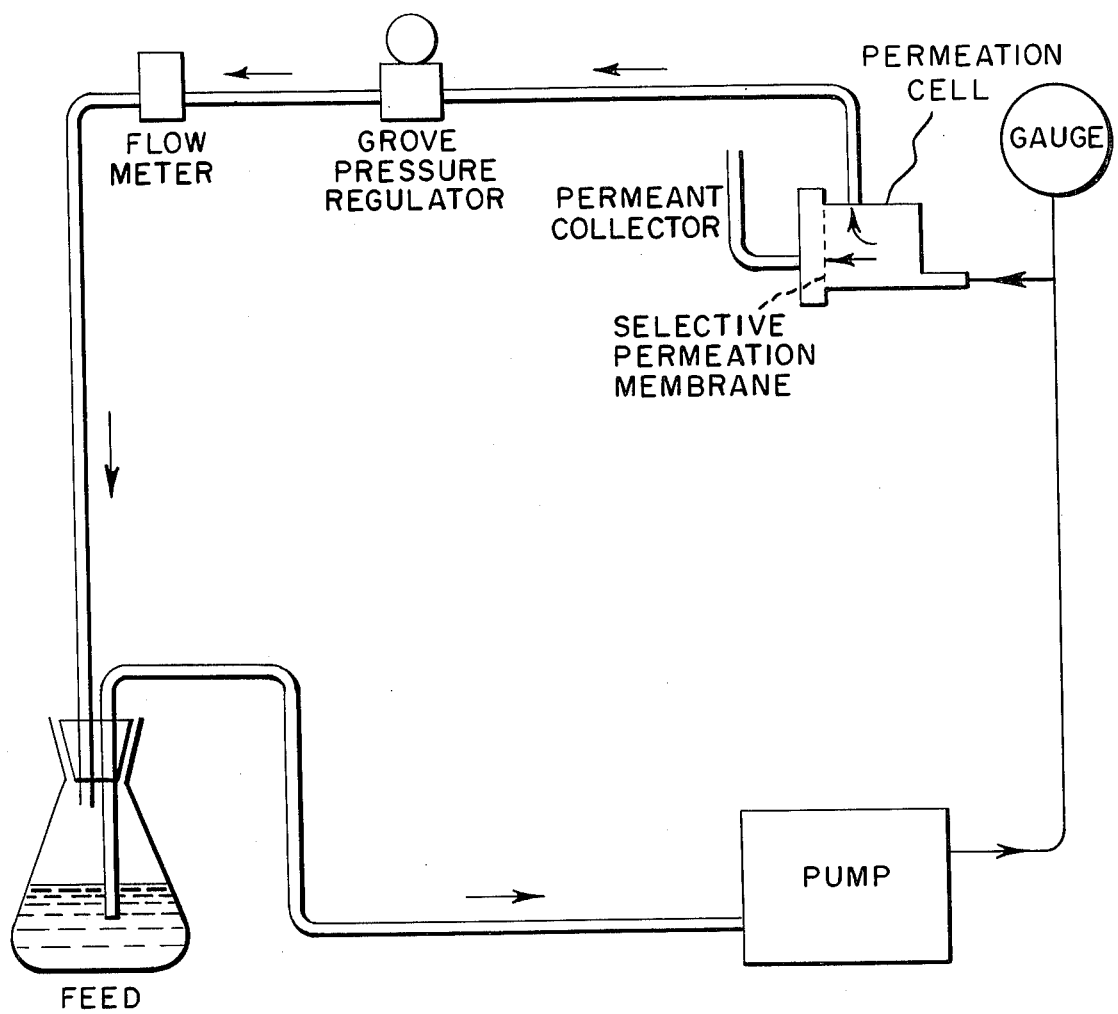
FIG. 2 is a schematic representation of an apparatus for using the asymmetric membranes.

One use of the asymmetric membranes of this invention as semipermeable membranes is a reverse osmosis procedure for liquids as illustrated in FIG. 2. In this embodiment the asymmetric membrane in the form of a flat disc is mounted in a leak-proof manner against a porous collection support. The liquid solution to be separated is pumped past the membrane at a controlled pressure. A fresh supply of solution to the face of the membrane is provided by a stirrer. Permeant passing through the membrane is collected and the rejected solution is collected separately or recycled.

In another embodiment the asymmetric membranes of this invention are employed in a selective permeation procedure for separating mixtures of gases. To show the utility of a membrane for separating hydrogen and methane, it is sufficient to measure the gas transmission rate of each separate gas through the membrane at a given pressure. The ratio of the gas transmission rates for the separate gases is substantially the same as the ratio in which a 50/50 mixture of the gases will be passed by the same membrane at the same pressure. A minor modification of the embodiment shown in FIG. 2 provides for handling the permeation of gases instead of liquids. This modification employs a closed pressure container for the feed and omits stirring of the mixture near the face of the membrane. Gas transmission rates are reported in GTR units which are defined as cubic centimeters of gas corrected to standard temperature and pressure transmitted by 100 square inches of membrane area per 24 hours per atmosphere of pressure. Thus, $$GTR = \frac{cc\ (STP)}{100\ in^2/24\ hr/atm}$$

In the asymmetric polyimide membranes of this invention it is possible to change and control the permeability properties by incorporating additives into the polyamic acid solution. As will be seen from the examples below, a wide variety of additives may be used, particularly organic and inorganic salts. The only requirement for operability is that the additive be soluble in the polyamic acid solution. The amount of additive employed can be varied widely and concentrations from 0.1% to about 30% of the weight of the polyamic acid are preferred.

In order to point up the differences between the prior art and the present invention, several symmetrical polyamide membranes A, B and C were prepared according to the prior art and compared with asymmetrical polyimide membranes of the invention. FIG. 3 shows that the membranes of this invention obey the fourth power law (Porod's rule of constancy) in producing substantially straight lines in scattering small angle X-rays whereas the prior art membranes A, B and C do not. Membrane A was a clear, symmetrical polyimide film made by the same procedure as Example 87 except that pyridine, a solvent for the polyamic acid, was used instead of triethylamine, a non-solvent for the polyamic acid. Reference to preceding parts of this specification teach that when a tertiary amine is used which is a solvent for the polyamic acid, the cyclizing solution must also contain a solvent B which is miscible with solvent A and a nonsolvent for the polyamic acid. Thus, use of solvent pyridine without the prescribed solvent B in the cyclizing solution does not produce an asymmetrical membrane. Membrane B was a clear, transparent polyimide film prepared by casting a 12% solution of the polyamic acid of Example 1, part A, onto a substrate. This was immersed in a cyclizing solution consisting of cyclohexane/acetic anhydride/pyridine (500/50/50 parts by volume) and kept there for 3 days. The film was rinsed with heptane twice, placed onto a frame and vacuum dried at 50° C. in a nitrogen atmosphere overnight. The film was transparent and had a symmetrical structure when examined microscopically.

This example also illustrates the condition that when a tertiary amine is used, which is a solvent for the polyamic acid, there must also be used the prescribed solvent B. Membrane C was a commercial sample of clear transparent symmetrical film of Kapton (Du Pont trademark) polyimide film.

SPECIFIC EMBODIMENTS OF THE INVENTION

The following examples, illustrating the novel membranes, the method of their preparation, and their utility, are given without any intention that the invention be limited thereto. All parts and percentages are by weight unless otherwise specified.

EXAMPLE 1

Polyimide from pyromellitic dianhydride and 4,4'-diamino diphenyl ether

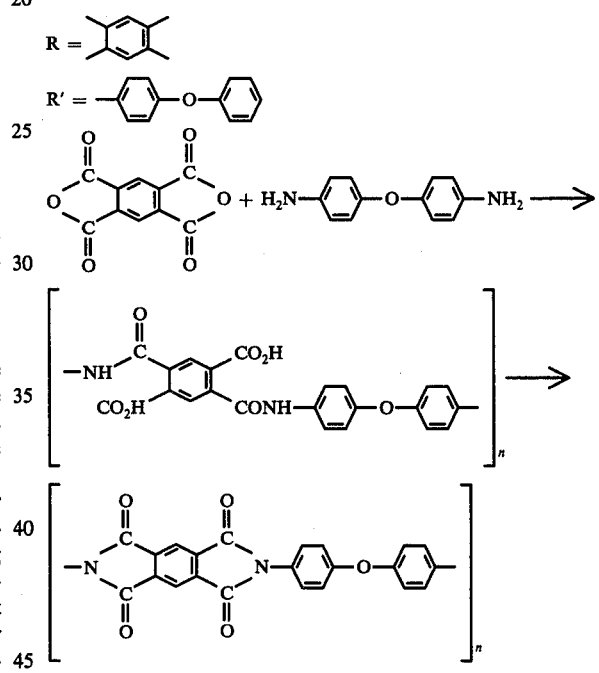

Part A

A 20% by weight solution of a polyamic acid was prepared from 4,4'-diaminodiphenyl ether and pyromellitic dianhydride in dimethylacetamide solvent using external cooling to maintain the temperature of the reaction below 40° C.

Part B

Figure 1:
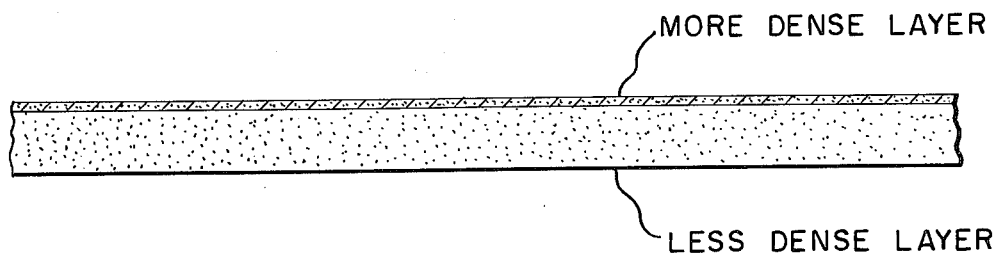

A portion of the above solution was diluted to 10% solids with anhydrous dimethylacetamide and spread on a glass plate with a doctor knife at room temperature to give a film with a thickness of about 15 mils. The assembly, without significant loss of solvent, was immersed in a benzene solution containing 1 molar triethylamine and 1 molar acetic anhydride. the solution was heated at 60°–70° C. for 30 minutes. During this time, the submerged film became cloudy and yellow and the cyclization reaction was completed. The film was then separated from the glass plate, washed with benzene to remove solvent A, etc., and dried under vacuum at 80° C. Based on infrared analysis the polymer was completely cyclized to the polyimide. The membrane was opaque and yellow, with one shiny side and one dull side. The shiny side was the one exposed directly to the cyclizing solution and was then dense side. FIG. 1 shows schematic cross-section of such an asymmetric membrane. The dull side was against the glass support during the cyclization reaction and was less dense, as shown in FIG. 1. This asymmetric polyimide film was about 2.3 mils thick.

EXAMPLE 2

Polyimide from pyromellitic dianhydride and 4,4'-diaminodiphenyl ether

A portion of the solution from Example 1, Part A, was diluted with anhydrous dimethylacetamide to contain 10% by weight of the polyamic acid. This solution was spread with a doctor knife on a glass plate at room temperature to give a film 15 mils thick. The assembly was then quickly placed without drying in a benzene solution containing 1 molar pyridine and 1 molar acetic anhydride. The bath was heated at 60°–75° C. for 30 minutes. During this time, the polymer became cloudy and yellow. The polymer film was removed from the glass, washed in benzene and dried at 80° C. in vacuum for 15 minutes. Based on infrared analysis the polymer was completely cyclized. It contained both "poly-n-imide", e.g., the nitrogen in the closed ring, the "poly-iso-imide", e.g., the oxygen in the closed ring. The asymmetric membrane was opaque and yellow with a shiny dense air side and a dull less dense back.

EXAMPLE 3

Part A

A dimethylacetamide solution containing 10% by weight of the polyamic acid obtained from pyromellitic dianhydride and 4,4'-diaminodiphenyl ether was prepared by diluting a portion of the solution of Example 1, Part A, with anhydrous dimethylacetamide. This solution was cast on a glass plate at room temperature at a thickness of 15 mils. The assembly was immersed without drying in a benzene bath containing 1 molar triethylamine and 1 molar acetic anhydride. The bath was heated at about 60°–75° C. for 15 minutes. The assembly was washed successively in a benzene bath, a benzene/denatured alcohol bath, and a water bath in which the membrane was removed from the glass plate. The membrane was air-dried. The asymmetric membrane obtained was a yellow opaque film with a shiny top and a dull back. The thickness of the finished membrane was 1.6 to 1.7 mils.

Part B

The procedure of Part A was repeated except that 10% lithium chloride by weight of the polyamic acid was dissolved in the dimethylacetamide solution before casting the film. An asymmetric membrane was obtained.

EXAMPLES 4–31

The procedure of Example 3, Part B, was repeated using in place of lithium chloride the modifiers shown in Table III below, percentages being based on the weight of the polyamic acid. In all of these examples, asymmetric membranes suitable for use in reverse osmosis separations were obtained.

TABLE III

| Example | Modifier |
|---|---|
| 4 | 10% $LiNO_3$ |
| 5 | 20% $LiNO_3$ |
| 6 | 10% $ZnBr_2$ |
| 7 | 10% $ZnCl_2$ |
| 8 | 10% $NaNO_3$ |
| 9 | 10% $Cu(NO_3)_2 \cdot 3H_2O$ |
| 10 | 10% ferric-acetylacetonate |
| 11 | 10% $Ni(NO_3)_2 \cdot 6H_2O$ |
| 12 | 10% LiBr |
| 13 | 5% $PdCl_2$ |
| 14 | 10% $[(C_6H_5)_3P]_2PtCl_2$ |
| 15 | 5% $(C_7H_7)_3PAuCl$ |
| 16 | 5% $[(C_7H_7)_3P]_3AgCl$ |
| 17 | 10% cupric acetylacetonate |
| 18 | 10% $AgOOCCF_3$ |
| 19 | 10% $AgOOCCF_2CF_3$ |
| 20 | 10% $AgOOC(CF_2)_2CF_3$ |
| 21 | 20% $Li_2PdCl_4$ |
| 22 | 10% $Li_2PdCl_4$ |
| 23 | 10% $([(C_7H_7)_3P]_3Cu_2Cl_2$ |
| 23A | 5% $[(C_7H_7)_3P]_3Cu_2Cl_2$ |
| 24 | 10% polyethylene oxide (Carbowax 1500) |
| 25 | 10% cetyl pyridinium bromide |
| 26 | 10% cetyl pyridinium bromide, 10% $Li_2PdCl_4$ |
| 27 | 30% $AgOOCCF_3$ |
| 28 | 20% $AgOOCCF_3$ |
| 29 | 30& $LiNO_3$ |
| 30 | 10% $AgPF_6$ |
| 31 | 10% adiponitrile |

EXAMPLE 32

A 10% dimethylacetamide solution of the polyamic acid obtained from pyromellitic dianhydride and 4,4'-diaminodiphenyl ether was prepared as in Example 1, Part A. To this was added 10% ferric acetylacetonate by weight of the polyamic acid. The resulting viscous solution was cast on a glass plate at +60° C. and at a thickness of 15 mils. After 1 minute in air at this temperature, during which time no sigificant loss of solvent occurred, the plate was placed in a benzene solution containing 1 molar acetic anhydride and 1 molar triethylamine. The reaction bath was kept at room temperature 15 minutes and then heated at about 60°–75° C for 15 minutes. The opaque yellow polyimide membrane which formed was washed in benzene, then in ethanol containing 2% benzene, and finally in water. The film was air-dried. The air side of the membrane was yellow and shiny and the bottom side dull and more porous. The finished membrane was about 1.5 mils thick.

EXAMPLES 33–38

Additional membranes were prepared by repeating the procedure of Example 32 but using in place of ferric acetylacetonate the modifiers listed in Table IV. All products were yellow opaque membranes suitable for use in reverse osmosis separations.

TABLE IV

| Example | Modifier |
|---|---|
| 33 | 10% $LiNO_3$ |
| 34 | 10% $ZnCl_2$ |
| 35 | 10% $AgOOCCF_3$ |
| 36 | 10% $NaNO_3$ |
| 37 | Nothing added |
| 38 | 10% $Li_2PdCl_4$ |

EXAMPLE 39

The procedure of Example 37 was repeated except that the film was cast at +85° C instead of at 60° C. An asymmetric membrane suitable for use in reverse osmosis was obtained.

EXAMPLE 40

A dimethylacetamide solution of 10% by weight of the polyamic acid obtained from pyromellitic dianhydride and 4,4'-diaminodiphenyl ether was prepared as in Example 1, Part B. This solution was cast at 25° C at a thickness of about 15 mils on a glass plate which had been wiped with a dispersion of a fluorocarbon telomer in a volatile hydrocarbon fluid (Slipspray ®). After 1 minute in the air, the assembly was placed in a toluene solution containing 1 molar triethylamine and 1 molar acetic anhydride to cyclize to the polyimide. The reaction bath was kept at room temperature for 15 minutes, then heated at about 60°–75° C for 15 minutes. The assembly was then washed successively in a benzene bath, a bath of ethyl alcohol containing 2% benzene, and finally a water bath where the membrane was separated from the glass plate. The opaque membrane was medium yellow with a shiny, dense air side and a less dense back, and was suitable as a membrane for reverse osmosis.

EXAMPLES 41–50

The procedure of Example 40 was repeated except that prior to casting, the additives shown in Table V were added to the polyamic acid solutions. The percentage of additive is based on the weight of polyamic acid. Asymmetric membranes suitable for use in reverse osmosis separations were obtained.

TABLE V

| Example | Modifier |
|---|---|
| 41 | 10% $ZnCl_2$ |
| 42 | 10% $LiNO_3$ |
| 43 | 10% $NaNO_3$ |
| 44 | 20% $Li_2PdCl_4$ |
| 45 | 10% $Li_2PdCl_4$ |
| 46 | 10% LiCl |
| 47 | 10% Ferric acetylacetonate |
| 48 | 30% $AgOOCCF_3$ |
| 49 | 20% $AgOOCCF_3$ |
| 50 | 10% LiBr |

EXAMPLE 51

The procedure of Example 40 was repeated with the exception of using n-heptane instead of toluene as the solvent for the cyclizing bath. An asymmetric membrane was obtained.

EXAMPLE 52

The procedure of Example 45 was repeated with the exception that tetrachloroethane was used in place of toluene as the solvent for the cyclizing bath. As asymmetric membrane was obtained.

EXAMPLE 53

Part A

Polyamic acid solution (20% by weight) was prepared as in Example 1, Part A. This solution was mixed with an appropriate amount of dimethylacetamide and adiponitrile to give a solution in which the polymer solids content was 10% by weight and the solvent was 10% adiponitrile, 90% dimethylacetamide by weight.

Part B

A 15-mil thick film of the solution described in Part A was spread with a doctor knife on a glass plate at 25° C. The glass plate was previously wiped with Slipspray ®. The film was quickly placed in a cyclizing bath of adiponitrile containing 1 molar triethylamine and 1 molar acetic anhydride. The bath was kept at room temperature for 15 minutes then heated at about 60°–75° C for 15 minutes. The opaque yellow membrane was then washed in a benzene bath, a bath of ethanol containing 2% benzene, and finally a water bath, then air-dried.

EXAMPLE 54

The polymer solution and the cyclizing bath were the same as in Example 53. The cyclized polyimide membrane was washed in adiponitrile and was useful as a membrane for reverse osmosis separation.

EXAMPLE 55

Part A

A solution of 20% by weight polymer in dimethylacetamide was prepared as in Example 1, Part A, and diluted with dry dimethylactamide to give a polymer solution which contained 15% by weight polyamic acid.

Part B

A 25-mil thick film of the solution described in Part A was spread on a glass plate with a doctor knife. After 1 minute in the air, the plate was placed in a benzene solution containing 1 molar triethylamine and 1 molar acetic anhydride. The bath was kept at room temperature 15 minutes then heated at about 60°–75° C for 15 minutes. The yellow opaque film was then washed in a benzene bath, a bath of ethanol containing 2% benzene, and finally a water bath, then air-dried. The thickness of the finished opaque yellow membrane was about 5.0 mils.

Part C

The procedures above were repeated except that the film was cast at a thickness of about 5 mils. The finished dried opaque yellow membrane was about 1.0 mil thick.

EXAMPLE 56

A 10% solution of the polyamic acid from 4,4'-diaminodiphenyl ether and pyromellitic dianhydride was prepared as in Example 1, Part B. On a glass plate which had previously been wiped with a dispersion of a fluorocarbon telomer in a volatile hydrocarbon fluid (Slipspray ®), a film of this solution was spread with a 15-mil doctor knife. The assembly was quickly immersed in a benzene solution containing 1 molar triethylamine and 1 molar acetic anhydride. The bath was held at room temperature for 15 minutes and then heated at 60°–70° C for 15 minutes. The plate carrying a yellow, opaque membrane was washed first in benzene and then in ethanol containing 2% benzene. In this latter wash the membrane was separated from the glass plate. The membrane was washed in water, air-dried, soaked for 2 hours in hexane, air-dried and then vacuum-dried at room temperature.

EXAMPLE 57

The procedure of Example 56 was repeated up through the separation of the membrane from the glass. The membrane was then washed in methylene chloride and dried in air.

EXAMPLES 58–68

The procedure of Example 57 was repeated except that before casting the films the modifiers shown in Table VI below were dissolved in the casting solution. Percentages are based on the weight of the dissolved polyamic acid.

TABLE VI

| Example | Modifier |
|---------|----------|
| 58 | 10% AgPF$_6$ |
| 59 | 10% NaNO$_3$ |
| 60 | 10% LiCl |
| 61 | 10% AgOOCCF$_3$ |
| 62 | 10% ZnCl$_2$ |
| 63 | 10% Li$_2$PdCl$_4$ |
| 64 | 10% LiBr |
| 65 | 10% NH$_4$PF$_6$ |
| 66 | 10% AgOOC(CF$_2$)$_2$CF$_3$ |
| 67 | 10% Li$_2$PdCl$_4$, 10% Cetylpyridinium bromide |
| 68 | 10% Adiponitrile, 10% Cetylpyridinium bromide |

EXAMPLE 69

A 15-mil thick film of a dimethylacetamide solution of 10% by weight polyamic acid obtained from pyromellitic dianhydride and 4,4 -diaminodiphenyl ether containing 10% AgOOCF$_2$CF$_3$ based on the weight of polymer present was spread with a doctor knife on a glass plate which has been spread with a dispersion of a fluorocarbon telomer in a volatile hydrocarbon solvent (Slipspray ®). The film was placed without significant loss of solvent in a cyclizing bath of 1 molar triethylamine and 1 molar acetic anhydride in 50 % benzene/50% tetrachloroethane. The bath was kept for 15 minutes at room temperature, then for 15 minutes at 60°–70° C. The opaque yellow polyimide membrane was then washed in (1) benzene, (2) ethanol containing 2% benzene, (3) water and then air-dried.

EXAMPLE 70

The procedure of Example 69 was repeated except the solvent in the cyclizing bath was tetrachloroethylene in place of benzene/tetrachloroethane.

EXAMPLE 71

The procedure of Example 69 was repeated except that the solvent for the cyclizing bath was trichloroethylene in place of benzene/tetrachlorethane.

EXAMPLE 72

Polyimide from pyrazine tetracarboxylic dianhydride and 4,4'-diaminodiphenyl ether

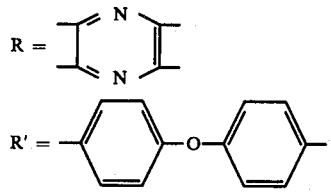

A 15-mil thick film of a solution of 16% by weight of a polyamic acid prepared from pyrazine tetracarboxylic dianhydride and 4,4'-diaminodiphenyl ether in dimethylacetamide by the procedure of Vaughan et al., above, was cast on a glass plate at room temperature. The plate was rapidly immersed in benzene containing 1 molar triethylamine and 1 molar acetic anhydride for 15 minutes at room temperature. The bath was then heated at 60°–70° C. for 5 hours. The film was then washed in (1) benzene, (2) methylene chloride, and then air-dried. The resulting opaque membrane was shiny on the air side and dull on the back. Based on infrared studies by attenuated total reflection, the polymer was completely cyclized to the polyimide.

EXAMPLE 73

Polyimide from 3,4,3',4'-diphenylsulfonetetracarboxylic dianhydride, 4,4'-diaminodiphenylsulfone and 4,4'-diaminodiphenyl ether

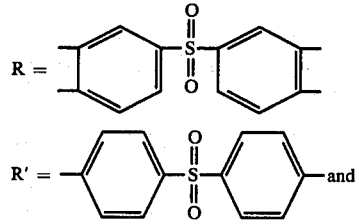

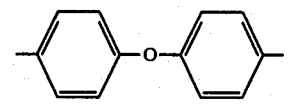

A polyamic acid was prepared from 3,4,3',4'-diphenylsulfonetetracarboxylic dianhydride and the two diamines, 4,4'-diaminodiphenylsulfone and 4,4'-diaminodiphenyl ether by the following procedure: In an anhydrous atmosphere, 12.3 g of 4,4'-diaminodiphenylsulfone was dissolved in 95 ml of dimethylacetamide and 17.8 of 3,4,3',4'-diphenylsulfonetetracarboxylic dianhydride was added. The reaction mixture became orange and increased in viscosity. The mixture was then heated to 70° C for 4 hours and allowed to cool to room temperature. Then 9.8 g of 4,4'-diaminodiphenyl ether was added. The mixture was stirred for 2 hours then dimethylacetamide (50 mil) and 17.8 g of 3,4,3',4'-diphenylsulfonetetracarboxylic dianhydride were added. The viscosity of the solution increased. The polymer solution was diluted to 19.1% solids by weight with dimethylacetamide. A 15-mil thick film of the polymer solution was cast on a glass plate at room temperature. The assembly was quickly immersed in benzene containing 1 molar triethylamine and 1 molar acetic anhydride for 15 minutes at room temperature and then for 30 minutes at 60°–70° C. The light yellow opaque membrane was washed in (1) benzene, (2) ethanol containing 2% benzene, and (3) water, then air-dried.

EXAMPLE 74

Polyimide from 3,4,3',4'-diphenylsulfonetetracarboxylic dianhydride and 4,4'-diaminodiphenyl ether

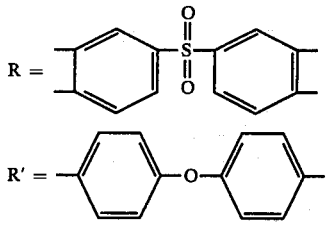

Part A

Under anhydrous conditions, a solution of 4,4'-diaminodiphenyl ether (40 g, 0.2 mol) in 300 ml of dimethylacetamide was mixed with 3,4,3',4'-diphenylsulfonetetracarboxylic dianhydride (71.6 g, 0.18 mol). The reaction mixture became viscous and the temperature rose to about 50° C. The polymer solution contained 28.3% solids by weight. This solution was diluted with dimethylacetamide to 14% (by weight) solids.

Part B

A 15-mil film of the solution from Part A was spread on a glass plate with a doctor knife. The assembly was rapidly immersed in a benzene solution containing 1 molar triethylamine and 1 molar acetic anhydride. The bath was kept at room temperature for 15 minutes then heated at 60°–70° C for 35 minutes. The resulting yellow opaque film was washed in (1) benzene and (2) ethanol containing 2% benzene, and air-dried. Based on infrared studies by attenuated total reflection, the polyamic acid was completely cyclized to the polyimide.

EXAMPLE 75

Polyimide from pyromellitic dianhydride and 4,4'-diaminodiphenyl-bis(trifluoromethyl)methane

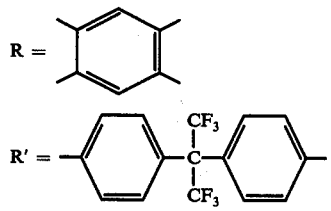

Part A

Under anhydrous conditions, 5.6 g of pyromellitic dianhydride was added to a stirred solution of 4,4'-diaminodiphenyl-bis(trifluoromethyl)methane (8.6 g) dissolved in 40 ml of dry pyridine. The reaction mixture became very viscous and 35 ml of dry dimethylacetamide was added. The solids content of the solution was 16.5% (by weight). The solution was then diluted to 13.2% solids with dry dimethylacetamide,

Part B

The 13.2% (by weight) polyamic acid solution from Part A was cast on a glass plate with a doctor knife at a thickness of about 15 mils. The polyamic acid was converted to the polyimide by the procedure of Example 74, Part B, then washed in (1) benzene, (2) ethanol containing 2% benzene and (3) water. The light yellow opaque membrane was air-dried. The membrane had a shiny skin on the top and a dull back. Based on infrared studies by attenuated total reflection, the polymer was completely cyclized to the polyimide.

EXAMPLE 76

Polyimide from 3,4,3',4'-benzophenonetetracarboxylic dianhydride and 4,4'-diaminodiphenyl ether

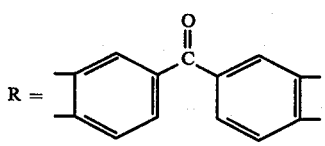

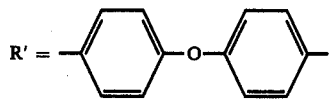

Part A

Under anhydrous conditions, 64.4 g (0.2 mol) of 3,4,3',4'-benzophenonetetracarboxylic dianhydride was added to a solution of 40 g (0.2 mol) of 4,4'-diaminodiphenyl ether in 300 ml of dimethylacetamide. The solution became viscous and contained 26.9% polyamic acid. It was diluted to 11.1% solids with dimethylacetamide.

Part B

A film of the solution in Part A was cast on a glass plate with a doctor knife to a thickness of about 15 mils. The polyamic acid was converted to the polyimide and washed as in Example 75. A medium yellow opaque film of approximate thickness 2.7 mils was obtained which, based on infrared studies by attenuated total reflection, showed only polyimide and no polyamic acid.

EXAMPLE 77

Part A

Cetylpyridinium bromide (10% based on weight of polymer) was dissolved in a portion of the 14% (by weight) solids polyamic acid solution of Example 74, Part A.

Part B

The solution from Part A was then cast as a film on a glass plate with a doctor knife at a thickness of about 15 mils. This assembly was then quickly immersed in a benzene bath containing 1 molar acetic anhydride and 1 molar triethylamine for 15 minutes with no heat, then for 15 minutes at 60°–70° C. The opaque film was washed in (1) benzene, (2) ethanol with 2% benzene, and (3) water, then air-dried.

EXAMPLE 78

Part A

To the polyamic acid solution of Example 74, Part A, was added 10% by weight silver trifluoroacetate (weight based on polyamic acid).

Part B

A film of the polyamic acid solution of Part A was cast with a doctor knife on a glass plate to a thickness of about 15 mils. The polyamic acid was cyclized to the polyimide as in Example 74 and washed as in Example 77. The finished membrane was opaque with a shiny light yellow top and a dull yellow back. It was about 2.9 mils thick.

EXAMPLE 79

Part A

To the 11.1% solids solution of Example 76, Part A, was added 10% (by weight) silver trifluoroacetate (based on the amount of polymer present).

Part B

A film about 15 mils thick of polymer solution from Part A was spread on a glass plate with a doctor knife. The polyamic acid was converted to the polyimide and washed as in Example 75, Part B. An opaque, light brown shiny-topped membrane with a dull yellow back was obtained.

EXAMPLE 80

Part A

To the polymer solution of Example 75, Part A, was added 10% silver trifluoroacetate (based on polymer present).

Part B

The solution of Part A was cast to a thickness of about 15 mils with a doctor knife on a glass plate. After 1 minute in the air, the polyamic acid was cyclized to the polyimide by immersing the assembly in a benzene bath containing 1 molar triethylamine and 1 molar acetic anhydride for 30 minutes with no heat and 30 minutes at 60°–70° C. The membrane was then washed in benzene, ethanol containing 2% benzene, and water, then air-dried. The opaque yellow film had a yellow dull back and a brown shiny top and was about 2.2 mils thick.

EXAMPLE 81

Part A

To the 19.1% polyamic acid solution of Example 73 was added 10% (by weight of the polyamic acid) LiNO₃.

Part B

A film of the solution from Part A was cast on a glass plate at 15 mils thickness. It was cyclized and washed using the procedure of Example 77, Part B. A yellow, opaque membrane was obtained.

EXAMPLE 82

Polyimides from pyromellitic dianhydride and 4,4'-diaminodiphenyl ether and 4,4'-diaminodiphenylsulfone

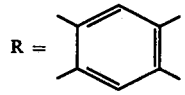

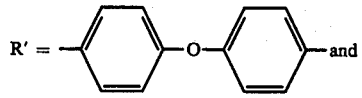

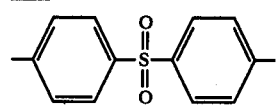

Part A

A solution of two polyamic acids was prepared by mixing equal weight amounts of a 20% (by weight) polyamic acid solution from pyromellitic dianhydride/4,4'-diaminodiphenyl ether in dimethylacetamide and a 22% (by weight) polyamic acid solution from pyromellitic dianhydride/4,4'-diaminodiphenylsulfone in dimethylacetamide.

Part B

A film from the above solution was cast on a glass plate with a doctor knife at a thickness of about 15 mils. The film was allowed to stand in the air for 1 minute, then cyclized to the polyimide and washed as in Example 77. A light yellow opaque membrane was obtained.

EXAMPLE 83

The procedure of Example 81, Parts A and B, was repeated except that cetylpyridinium bromide was used in place of lithium nitrate. A yellow, opaque membrane was obtained.

EXAMPLE 84

Polyimide from 3,4,3',4'-diphenylsulfone tetracarboxylic dianhydride, 4,4'-diaminodiphenyl ether and lithium 2,4-diaminobenzenesulfonate

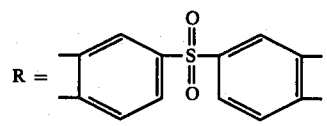

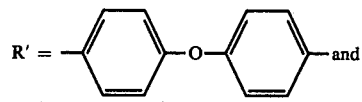

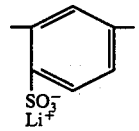

Part A

Under anhydrous conditions, lithium 2,4-diaminobenzenesulfonate (9 g., 0.05 mol) was partially dissolved in 130 ml dry dimethylacetamide. Then 3,4,3',4'-diphenylsulfone tetracarboxylic dianhydride (17.9 g, 0.05 mol) was added with agitation. The solution increased in viscosity and the temperature rose to about 50° C. The mixture was stirred for 2 hours, then 4,4'-diaminodiphenyl ether (10 g, 0.05 mol) was added. The solution became viscous and 50 ml of dry dimethylacetamide was added. The reaction mixture was stirred for 20 minutes. Then the remainder of the 3,4,3',4'-diaminodiphenylsulfone tetracarboxylic dianhydride (17.9 g, 0.05 mol) was added. The solution became very viscous. The solids content of the polymer solution was 23.3% (by weight) solids. This was diluted with dimethylacetamide to give a solution containing 13% solids.

Part B

A solution of the above polyamic acid containing 13% solids was cast on a glass plate with a doctor knife to a thickness of about 15 mils. The polyamic acid was converted to the polyimide and washed as in Example 77. An opaque yellow membrane about 2.5 mils thick was obtained.

TABLE X-continued

| Membrane Example | Operating Pressure (psi) | Feed Mol % CH₃CN | Permeate Mol % CH₃CN |
|---|---|---|---|
| 18 | 500 | 63.9 | 69.4 |

EXAMPLE 92

This example illustrates the concentration of a large molecule dissolved in an organic solvent. The feed solution was 1% by weight of the macrocyclic ether dibenzo-18-crown-6 in acetonitrile. The concentration of the "crown 6" was based on optical density measurements in the ultraviolet region. This compound is 2,3,11,12-dibenzo-1,4,7,10,13,16-hexaoxacyclooctadeca-2,11-diene; C. J. Pedersen, J. Am. Chem. Soc., 89, 7017–36 (1967).

TABLE XI

| Membrane Example | Operating Pressure (psi) | % Crown 6 Rejection |
|---|---|---|
| 3-A | 500 | ~ 73 |
| 18 | 500 | ~ 98 |

EXAMPLE 93

This example illustrates the ability of the membranes to separate hydrogen and methane from each other. Each pure gas was separately passed through the membrane and the rate of transmission measured. The pressure used was 39.7 psi to 314.7 psi. The selectivity was determined by dividing the rate of transmission of hydrogen by that of methane. Selectivity of greater than 3 is considered significant. As previously noted, the ratio of the gas transmission rate for the separate gases is substantially the same as the ratio in which a 50/50 mixture of the gases will be passed by the same membrane at the same pressure.

TABLE XII

| Membrane Example | Rate H₂ Permeation in GTR Units | Selectivity for Hydrogen over Methane |
|---|---|---|
| 3-B | 49,222 | 53 |
| 3-A | 2,216 | 83 |
| 4 | 1,776 | 221 |
| 6 | 1,765 | 77 |
| 7 | 2,360 | 197 |
| 8 | 2,483 | 97 |
| 12 | 3,075 | 95 |
| 18 | 2,312 | 110 |
| 21 | 2,052 | 102 |
| 22 | 3,400 | 86 |
| 25 | 100,730 | 18 |
| 26 | 4,516 | 105 |
| 30 | 52,586 | 12 |
| 32 | 3,113 | 112 |
| 34 | 1,670 | 134 |
| 36 | 2,887 | 193 |
| 38 | 5,844 | 65 |
| 39 | 2,873 | 99 |
| 40 | 1,180 | 70 |
| 42 | 2,258 | 125 |
| 43 | 2,975 | 116 |
| 44 | 2,713 | 104 |
| 45 | 2,866 | 68 |
| 46 | 1,581 | 102 |
| 47 | 2,765 | 72 |
| 50 | 2,097 | 99 |
| 52 | 3,500 | 47 |
| 56 | 83,205 | 22.5 |
| 60 | 9,267 | 27 |
| 62 | 2,000 | 133 |
| 63 | 8,998 | 25 |
| 64 | 28,339 | 7 |
| 65 | 3,627 | 94 |
| 68 | 157,810 | 6.1 |
| 70 | 3,982 | 53 |
| 78 | 2,417 | 263 |
| 80 | 43,912 | 34 |

TABLE XII-continued

| Membrane Example | Rate H₂ Permeation in GTR Units | Selectivity for Hydrogen over Methane |
|---|---|---|
| 82 | 1,720 | 114 |

A comparable film of commercial, symmetrical Kapton ® was tested in the same way at a pressure of 414.7 psi. It had a permeation rate for hydrogen of 290 GTR's and a selectivity for hydrogen over methane of 483. The very low GTR makes the Kapton ® membrane almost useless for any practical separation.

EXAMPLE 94

The concentration of a 1% dimethylformamide water solution was demonstrated by selective passage of water by the membrane of Example 84. The membrane showed about 66% rejection of the dimethylformamide.

EXAMPLE 95

The membrane of Example 25 was tested for concentration of a 10% (by weight) solution of sulfuric acid in water. At 950 psi the membrane showed only 1.4% passage of $H_2SO_4$.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

The embodiments of the invention in which an exclusive property or privilege is claimed are defined as follows:

1. A microporous, opaque, asymmetric polyimide membrane not dissolving more than 10% by weight at 25° C in N,N-dimethylacetamide and consisting essentially of a polyimide having the repeating formula $$\left[ \begin{array}{c} \text{N} \diagup \begin{array}{c} \text{C=O} \\ \text{C=O} \end{array} \diagdown \text{R}^5 \diagup \begin{array}{c} \text{C=O} \\ \text{C=O} \end{array} \diagdown \text{N}-\text{R}^6 \end{array} \right]$$

wherein $R^5$ is selected from the group consisting of

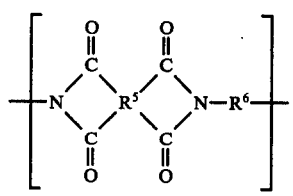,

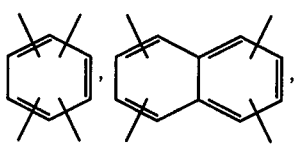,

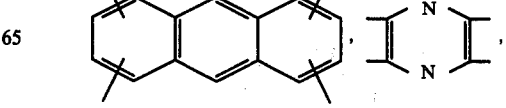

EXAMPLE 85

Polyimide from pyromellitic dianhydride, 4,4'-diaminodiphenyl ether and 4,4'-diaminodiphenyl-bis(trifluoromethyl)methane

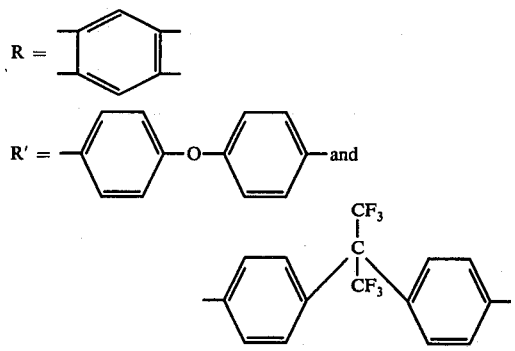

Part A

Under anhydrous conditions, the diamines of 4,4'-diaminodiphenyl-bis(trifluoromethyl)methane (5.96 g, 0.025 mol) and 4,4'-diaminodiphenyl ether (3.2 g, 0.025 mol) were dissolved in 119.5 ml of dimethylacetamide. Then pyromellitic dianhydride (8 g, 0.036 mol) was added. The temperature rose to about 40° C and the viscosity of the solution increased. An additional 3.2 g (0.025 mol) of 4,4'-diaminodiphenyl ether was added. When it was dissolved, 7.0 g (0.032 mol) of pyromellitic dianhydride was added. The viscosity of the solution increased greatly and 50 ml of dimethylacetamide was added. Additional 4,4'-diaminodiphenyl ether (3.2 g, 0.025 mol), 50 ml of dimethylacetamide, pyromellitic dianhydride (6.8 g, 0.032 mol), and 95.5 ml of dimethylacetamide were added, respectively. The solution was very viscous and the solids content was 11.2%.

Part B

A solution of the above polyamic acid containing 11.2% solids was cast on a glass plate with a doctor knife to a thickness of about 15 mils. The polyamic acid was converted to the polyimide and washed as in Example 77. A yellow opaque membrane of about 2.8 mils thickness was obtained.

EXAMPLE 86

A portion of the polyamic acid solution from Example 1, Part A, was diluted to 10% solids with dimethylacetamide and extruded without loss of solvent from an 18 gauge syringe needle into a benzene bath containing 1 molar triethylamine and 1 molar acetic anhydride. The bath was then heated at 60°-70° C. for 15 minutes. The filament was removed, washed in benzene, then in ethanol and air-dried. The resulting opaque yellow filament had a shiny outer surface and a porous interior.

EXAMPLE 87

A portion of the solution from Example 1, Part A, was diluted with dimethylacetamide to contain 10% by weight of the polyamic acid. This solution was spread with a doctor knife on a glass plate to give a solution 15 mils thick. The assembly, without significant loss of solvent, was immersed in a cyclizing bath containing 50% triethylamine and 50% acetic anhydride. The bath was kept at room temperature for 15 minutes, and then heated at 60°-70° C. for 15 minutes. The cyclized polyimide membrane was then washed in benzene, then in ethanol containing 2% benzene and finally in water, in which latter bath the membrane was removed from the glass plate. The asymmetric film was opaque and yellow.

The polyimide structures prepared in Examples 1–85 and 87 are all asymmetric membranes which are useful for separating liquids and gases by reverse osmosis or selective permeation. This is illustrated in the Examples which follow. These separations employed the apparatus of FIG. 2 and the respective procedures for liquids and gases as described above. Each membrane is identified by the number of the Example where its preparation is described.

EXAMPLE 88

This example illustrates the removal of sodium chloride from water. The feed solution containing 0.5% of NaCl in water. The operating pressure was 600 psi.

TABLE VII

| Membrane Example | % Salt Rejection | Rate of Permeation (gal/ft$^2$ day) |
|---|---|---|
| 55 | 92.3 | 6.00 |
| 3-A | 87.4 | 4.80 |
| 3-B | 65.0 | 3.70 |
| 61 | 87.0 | 2.70 |

EXAMPLE 89

This example illustrates the separation of a cyclohexene/cyclohexanol mixture. The permeate was analyzed by gas chromatography.

TABLE VIII

| Membrane Example | Operating Pressure (psi) | % Cyclohexanol in Feed | % Cyclohexanol in Permeate |
|---|---|---|---|
| 23 | 335 | 35.0 | 21.5 |
| 3-A | 300 | 20.6 | 17.3 |
| 18 | 1200 | 10.5 | 12.4 |
| 77 | 1200 | 10.5 | 15.9 |

EXAMPLE 90

This example illustrates the separation of hexane/ethanol mixture. The feed and permeate were analyzed by gas chromatography.

TABLE IX

| Membrane Example | Operating Pressure (psi) | % Ethanol in Feed | % Ethanol in Permeate |
|---|---|---|---|
| 25 | 600 | 89.6 | 92.7 |
| 25 | 1000 | 89.6 | 94.4 |
| 25 | 600 | 50.0 | 67.0 |
| 25 | 1000 | 50.0 | 73.0 |
| 23 | 800 | 50.0 | 76.0 |
| 3-A | 800 | 50.0 | 75.0 |
| 23 | 300 | 61.0 | 73.0 |

EXAMPLE 91

This example illustrates the separation of a water/acetonitrile solution. The solution composition analysis was done by proton nuclear magnetic resonance.

TABLE X

| Membrane Example | Operating Pressure (psi) | Feed Mol % CH$_3$CN | Permeate Mol % CH$_3$CN |
|---|---|---|---|
| 76 | 1000 | 62.1 | 65.5 |
| 74 | 1000 | 62.1 | 65.6 |
| 25 | 500 | 63.9 | 58.4 |

-continued

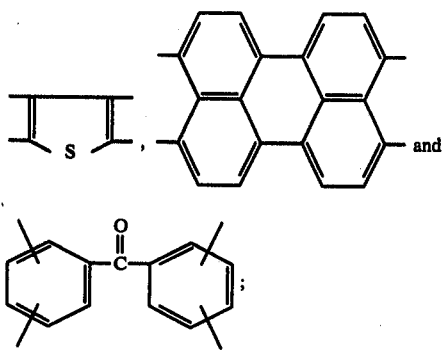 and and $R^6$ is selected from the group consisting of phenylene, tolylene, naphthylene, biphenylene, anthrylene, pyridinediyl and

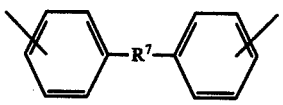

in which $R^7$ is selected from the group consisting of oxygen, sulfur and methylene, said membrane being shiny on one surface and dull on the other surface, and having a corrected small angle X-ray scattering pattern such that the intensity of the scattering radiation from nickel filtered CuKα radiation multiplied by the fourth power of the scattering angle ($2\frac{1}{2}$) does not vary more than ± 10% for at least 0.2° within the angle range ($2\theta$) from 0.2–0.8°.

2. The membrane of claim 1 which is the polyimide from pyromellitic dianhydride and 4,4'-diaminodiphenyl ether.

3. The membrane of claim 1 which is the polyimide from pyrazine tetracarboxylic dianhydride and 4,4'-diaminodiphenyl ether.

4. The membrane of claim 1 which is the polyimide from 3,4,3',4'-benzophenonetetracarboxylic dianhydride and 4,4'-diaminodiphenyl ether.

5. The membrane of claim 1 which is the polyimide from pyromellitic dianhydride, 4,4'-diaminodiphenyl-bis(trifluoromethyl)methane and 4,4'-diaminodiphenyl ether.

6. The membrane of claim 1 in the form of a hollow fiber.

* * * * *